G. D. WIGGINS.
BORING MACHINE.
APPLICATION FILED JULY 13, 1908.
942,389.
Patented Dec. 7, 1909.
2 SHEETS—SHEET 1.
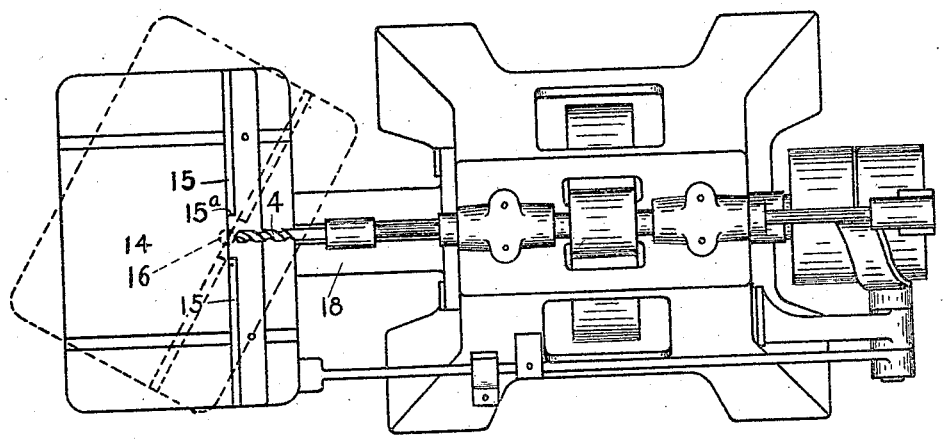
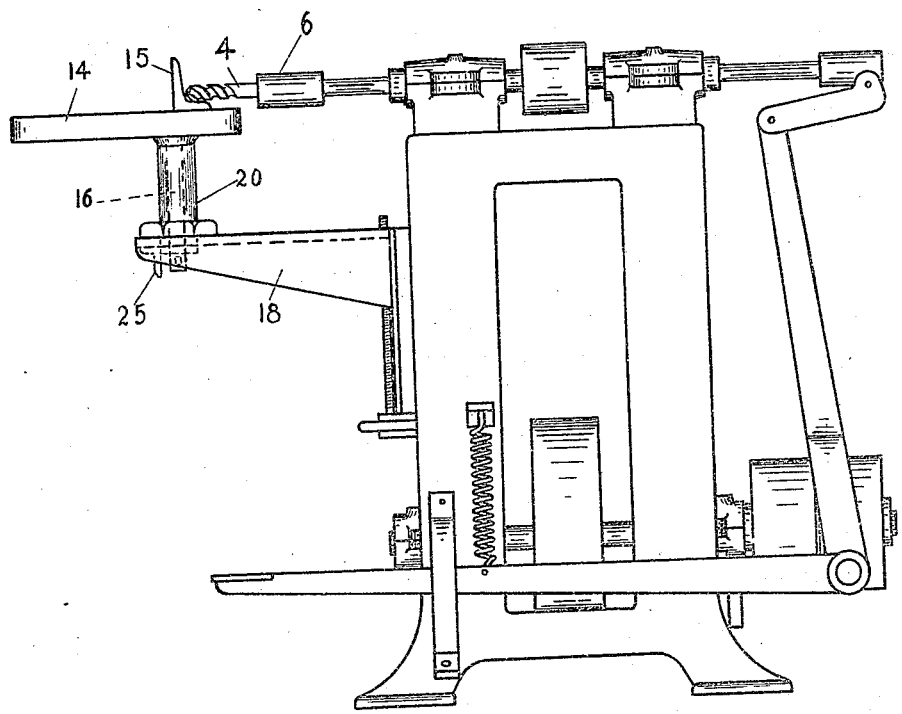
WITNESSES:
J. Ray Abbey
Ralph S. Warfield
INVENTOR
George D. Wiggins
BY
Geo. B. Willcox
ATTORNEY G. D. WIGGINS.
BORING MACHINE.
APPLICATION FILED JULY 13, 1908.
942,389.
Patented Dec. 7, 1909.
2 SHEETS—SHEET 2.
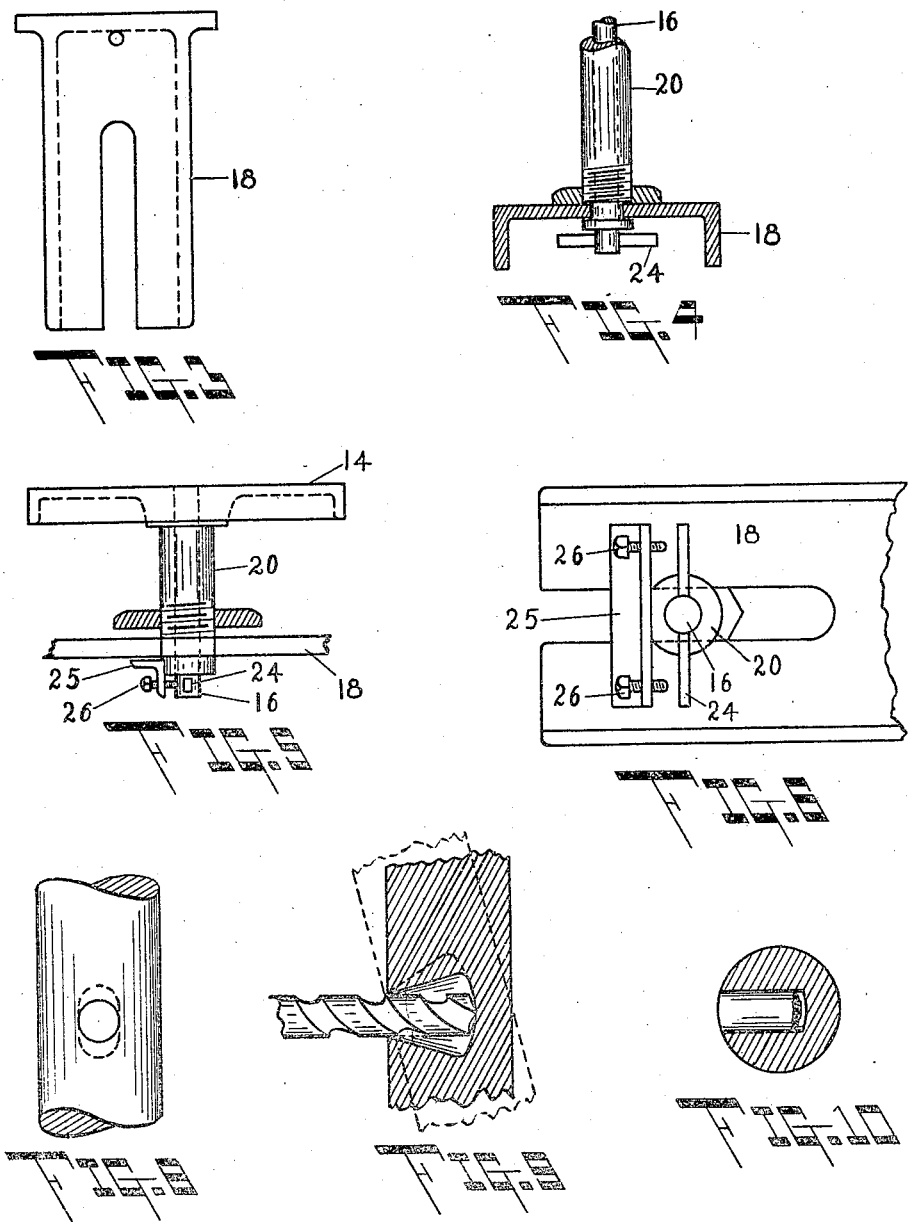
WITNESSES:
J. Ray Abbey
Ralph S. Warfield
INVENTOR
George D. Wiggins
BY
George B. Willer
ATTORNEY

UNITED STATES PATENT OFFICE.

GEORGE D. WIGGINS, OF SAGINAW, MICHIGAN.

BORING-MACHINE.

942,389. Specification of Letters Patent. Patented Dec. 7, 1909.

Application filed July 13, 1908. Serial No. 443,204.

*To all whom it may concern:*

Be it known that I, GEORGE D. WIGGINS, a citizen of the United States, residing at Saginaw, in the county of Saginaw and State of Michigan, have invented certain new and useful Improvements in Boring-Machines; and I do hereby declare the following to be a full, clear, and exact description of the invention, such as will enable others skilled in the art to which it appertains to make and use the same.

My invention relates to boring machines, the object of which is to bore a hole or recess wider at the inner end than at the outer end, such hole or recess having at least two diverging sides or walls extending at an incline from the outer to the inner end.

The invention broadly comprises a tool and a table, one of which is laterally movable relative to the other to form a mortise of the kind set forth.

To these and other ends, my invention consists in certain novel features and combinations such as will be more fully described hereinafter and particularly pointed out in the claims.

In the accompanying drawings, Figure 1 is a side view of a machine embodying my invention, Fig. 2 is a top plan view thereof, Fig. 3 is a detail top plan view of the adjustable bracket supporting the work table. Figs. 4 and 5 are detail sectional views showing the manner of supporting the table on the bracket, Fig. 6 is a bottom plan view of the bracket, Fig. 7 is a detail view of the column and Figs. 8, 9 and 10 are detail views showing one form of mortise.

It is obvious that to bore a funnel shaped recess or mortise from the smaller end, it will be necessary either to move the work laterally in the arc of a circle relative to the tool or vice versa, to move the tool laterally in the arc of a circle relative to the work. Furthermore, the center of the arc of movement must be about a point coincident with the point where the bit enters the work, and either frusto-conical or elongated mortises can be produced.

I have shown a machine wherein the work support is movable laterally relative to the tool during the formation of the mortise.

The work is held on a suitable table, the latter being moved laterally relative to a suitably rotated longitudinally slidable tool 4. As one such construction I have shown a table (14) carrying the gage (15), the gage having a slot (15ª) of suitable width formed therein in alinement with the tool to permit the latter to engage the work. This table is pivotally supported relative to a vertically adjustable bracket 18, it being important that the axis of movement of the table lie in the plane of the forward face of the gage 15.

In operation, the work is placed on the table and against the gage (15), the point to be bored lying directly over the vertical axis of movement of the table (14), and in alinement with the tool, the end of which tool is brought against the work in a straight line intersecting the axis of movement of the table. As soon as the tool has entered the work to the desired depth, the table is swung laterally first in one direction and then in the other. The movement of the table about its vertical axis does not enlarge the mortise opening to any appreciable extent, but is equivalent to swinging the tool in opposite directions on a pivot coincident with the vertical diameter of the mortise opening. Such a movement as described forms a mortise having two parallel walls, two divergent walls and a curved bottom as shown in Figs. 8, 9 and 10.

In order to limit the swinging movement of the table relative to the tool, I provide a suitable stop mechanism, that shown consisting of a tongue 24 carried by a rod 16. The table (14) is mounted on the rod which latter is received in a hollow column 20 slidably supported on the vertically adjustable bracket 18. The table is supported upon the upper end of the column. This column carries a bar 25 normally lying parallel with the tongue. Near its opposite ends the bar is equipped with set screws 26 adapted to be engaged by the ends of the tongue to limit the swinging movement of the table relative to the tool and hence regulate the width of the mortise at its inner end.

It is obvious that changes might be made in the form and arrangement of the several parts described without departing from the spirit and scope of my invention.

Having thus fully disclosed my invention, what I claim as new is:—

1. A boring machine comprising a table, a pivotally supported rod to which the table is secured, the table adapted to oscillate in a horizontal plane, a gage extending across the table and having an opening intermediate its ends in alinement with the axis of rotation of the table, the outer face of the gage against which the work abuts, lying in the same vertical plane with the axis of rotation of the table, and a rotatable boring tool whose longitudinal axis lies at right angles to the axis of rotation of the table, the operative end of the tool receivable in the opening in the gage.

2. The combination with a tool, of a bracket, a column slidably mounted on the bracket, a rod rotatably received in the column, a table loosely resting on and supported by the column, the table secured to the rod, and coöperating means carried by the column and rod respectively for limiting the horizontal swinging movement of the table relative to the tool.

3. A boring machine comprising a boring tool, a table adapted to swing in a horizontal plane relative to the tool, the tool extending radially to the arc of movement described by the table, and a non-adjustable gage extending transversely of the table and having an opening therethrough to accommodate the tool, the outer face of the gage against which the work abuts lying in a vertical plane intersecting the axis of oscillation of the table to bring the face of the work in line with the vertical axis of oscillation.

4. A boring machine comprising a boring tool, a bracket, a column mounted on the bracket, a rod passing through and rotatable in the column, a table carried by the rod and loosely resting on the upper end of the column, a tongue projecting laterally from the rod, and means on the bracket engaged by the tongue for limiting the horizontal swinging movement of the table.

In testimony whereof, I affix my signature in presence of two witnesses.

GEORGE D. WIGGINS.

Witnesses:
 RALPH S. WARFIELD,
 J. RAY ABBEY.